US010634775B2

(12) United States Patent
Loesch et al.

(10) Patent No.: US 10,634,775 B2
(45) Date of Patent: Apr. 28, 2020

(54) MIMO RADAR DEVICE FOR THE DECOUPLED DETERMINATION OF AN ELEVATION ANGLE AND AN AZIMUTH ANGLE OF AN OBJECT AND METHOD FOR OPERATING A MIMO RADAR DEVICE

(71) Applicant: Robert Bosch GmbH, Stuttgart (DE)

(72) Inventors: Benedikt Loesch, Stuttgart (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 15/510,280

(22) PCT Filed: Sep. 4, 2015

(86) PCT No.: PCT/EP2015/070200
§ 371 (c)(1),
(2) Date: Mar. 10, 2017

(87) PCT Pub. No.: WO2016/045938
PCT Pub. Date: Mar. 31, 2016

(65) Prior Publication Data
US 2017/0307744 A1    Oct. 26, 2017

(30) Foreign Application Priority Data

Sep. 23, 2014   (DE) .................. 10 2014 219 113

(51) Int. Cl.
*G01S 13/00*   (2006.01)
*G01S 13/06*   (2006.01)
(Continued)

(52) U.S. Cl.
CPC ............. *G01S 13/06* (2013.01); *G01S 7/03* (2013.01); *G01S 13/003* (2013.01); *G01S 13/42* (2013.01);
(Continued)

(58) Field of Classification Search
CPC ...... G01S 13/06; G01S 13/003; H01Q 21/293; H01Q 21/296
(Continued)

(56) References Cited

U.S. PATENT DOCUMENTS

2010/0123616 A1   5/2010  Minami
2012/0256795 A1   10/2012 Tajima

FOREIGN PATENT DOCUMENTS

CN    103901417 A         7/2014
DE    102011084610 A1 *   4/2013  ............. G01S 13/34
(Continued)

OTHER PUBLICATIONS

International Search Report dated Dec. 4, 2015, of the corresponding International Application PCT/EP2015/070200 filed Sep. 4, 2015.

*Primary Examiner* — Peter M Bythrow
*Assistant Examiner* — Helena H Seraydaryan
(74) *Attorney, Agent, or Firm* — Norton Rose Fulbright US LLP; Gerard Messina (57) ABSTRACT

A MIMO radar device for the decoupled determination of an elevation angle and azimuth angle of an object. The MIMO radar device includes an antenna array including multiple transmitting antennas, whose phase centers are situated spaced apart from one another along a first coordinate direction; and multiple receiving antennas, whose phase centers are situated spaced apart from one another along the first coordinate direction; the phase center of at least one of the transmitting antennas being spaced apart from the phase centers of the remaining transmitting antennas by an offset value along a second coordinate direction; the phase center of at least one of the receiving antennas being spaced apart
(Continued)

from the phase centers of the remaining transmitting antennas by the offset value along the second coordinate direction; an evaluation unit to evaluate electromagnetic signals for the decoupled determination of the elevation angle and the azimuth angle of the object.

12 Claims, 5 Drawing Sheets

(51) Int. Cl.
| | |
|---|---|
| *G01S 13/931* | (2020.01) |
| *H01Q 1/32* | (2006.01) |
| *H01Q 21/06* | (2006.01) |
| *H01Q 25/00* | (2006.01) |
| *H01Q 21/29* | (2006.01) |
| *G01S 7/03* | (2006.01) |
| *G01S 13/42* | (2006.01) |
| *G01S 13/93* | (2020.01) |

(52) U.S. Cl.
CPC ......... *G01S 13/931* (2013.01); *H01Q 1/3233* (2013.01); *H01Q 21/065* (2013.01); *H01Q 21/293* (2013.01); *H01Q 21/296* (2013.01); *H01Q 25/00* (2013.01); *G01S 2013/9375* (2013.01)

(58) Field of Classification Search
USPC .......................................................... 342/147
See application file for complete search history.

(56) References Cited

FOREIGN PATENT DOCUMENTS

| DE | 102011084610 A1 | 4/2013 | |
|---|---|---|---|
| EP | 0947852 A1 * | 10/1999 | ............. G01S 13/42 |
| EP | 947852 A1 | 10/1999 | |
| EP | 2315311 A1 | 4/2011 | |
| JP | 2010008319 A | 1/2010 | |
| JP | 2010117313 A | 5/2010 | |
| JP | 2010175471 A | 8/2010 | |
| WO | 2013034281 A1 | 3/2013 | |
| WO | 2013034282 A1 | 3/2013 | |
| WO | WO-2013034282 A1 * | 3/2013 | ............. G01S 7/032 |

* cited by examiner

MIMO RADAR DEVICE FOR THE DECOUPLED DETERMINATION OF AN ELEVATION ANGLE AND AN AZIMUTH ANGLE OF AN OBJECT AND METHOD FOR OPERATING A MIMO RADAR DEVICE

FIELD

The present invention relates to a MIMO radar device for the decoupled determination of an elevation angle and an azimuth angle of an object and a method for operating the MIMO radar device according to the present invention. The MIMO radar device may be situated in particular in a vehicle, such as a road, rail, air, or water vehicle.

BACKGROUND INFORMATION

MIMO stands for "multiple input multiple output" in technical use and refers to a system or method, according to which multiple transmitting antennas and multiple receiving antennas are used for achieving an effect, for example, for transmitting information or, as in the present case, for detecting at least the location of an external object using a radar device. Transmitting antennas are designed in particular for emitting an electromagnetic signal. Receiving antennas are designed in particular for receiving an electromagnetic signal. When "antennas" are referred to here and hereafter, these are to be understood to include both transmitting antennas and receiving antennas, without differentiation.

A variety of electronic systems are used in modern vehicles, which may be used, for example, to assist a driver when driving the vehicle. For example, brake assistants may recognize preceding road users and decelerate and accelerate the vehicle accordingly, so that a predefined minimum distance to the preceding road users is always maintained. Such brake assistants may also initiate emergency braking if they recognize that the distance to the preceding road user becomes excessively small.

To be able to provide such assistance systems in a vehicle, it is necessary to detect data about the surroundings of the particular vehicle. In the above-mentioned example of a brake assistant for example, it is necessary to detect the position of a preceding road user to be able to calculate the distance of the vehicle to the preceding road user.

To detect the position of the preceding road user, for example, the azimuth angle of the preceding road user may be determined originating from the travel direction of the particular vehicle. The azimuth angle is part of an advantageous spherical coordinate system which initially relates to the radar device, but in the case of a radar device situated in a vehicle, accordingly relates to the vehicle. The azimuth angle is situated with respect to the vehicle in such a way that the azimuth angle scans a plane in parallel to the travel plane, which the vehicle is traveling, upon a variation from 0° to 360°. With the aid of the azimuth angle, for example, an object to the left of the vehicle in the forward travel direction is differentiable from an object to the right of the vehicle in the forward travel direction.

Since objects which are not functionally relevant, such as manhole covers or bridges, also reflect electromagnetic signals as radar signals, the detection of the elevation angle enables a differentiation between functionally relevant and nonrelevant objects. The elevation angle is a further part of the described spherical coordinate system and scans a plane which is perpendicular to the roadway on which the vehicle is traveling upon a variation from 0° to 360°. The last independent coordinate of the described spherical coordinate system is the distance or radius.

The azimuth angle and/or the elevation angle of an object may be detected, for example, by analyzing the electromagnetic phase offsets and/or amplitudes at the receiving antennas of a radar device of received electromagnetic signals which are reflected on the object.

US 2012/256795 A1 describes a possible antenna for such a radar device.

For a two-dimensional antenna array having phase centers xi in a first coordinate direction and yi in a second coordinate direction, which is perpendicular thereto, the following equation applies for phase $\varphi i$ at antenna i:

$$\varphi i = \frac{2\pi}{\lambda}(xi * \sin\theta * \cos\Phi + yi * \sin\Phi)$$

In the equation, $\theta$ represents the azimuth angle and $\Phi$ represents the elevation angle.

In a general two-dimensional antenna array, azimuth angle and elevation angle have to be computed jointly. The computing effort thus increases greatly. It is therefore desirable to decouple the computation of azimuth angle and elevation angle.

Furthermore, it is desirable to manage with a preferably small number of antennas, i.e., transmitting and receiving antennas, of the antenna array of the MIMO radar device. The application of the conventional MIMO principle combines reception signals of multiple switching states and thus enables the formation of virtual arrays having an enlarged aperture of a high number of virtual antennas.

The formation of virtual arrays $av(\theta)$ is carried out by convolution of the receiving antenna array, which is made up of the receiving antennas, with the transmitting antenna array, which is made up of the transmitting antennas, i.e., by forming all possible products of one-way antenna diagrams $atx(\theta)$ of the transmitting antennas with one-way antenna diagrams $arx(\theta)$ of the receiving antennas:

$$av(\theta) = atx(\theta) \otimes arx(\theta),$$

(X) symbolizing the Kronecker product, i.e., forming all possible products of the elements of vectors $atx(\theta)$ and $arx(\theta)$.

Objects moving in relation to the radar device result in a phase offset between transmitting states in time multiplex MIMO, because of which compensation methods are applied for a compensation of the phase offset.

SUMMARY

The present invention provides a MIMO radar device for the decoupled determination of an elevation angle and an azimuth angle of an object including: an antenna array having multiple transmitting antennas, whose phase centers are situated spaced apart from one another along a first coordinate direction; and multiple receiving antennas, whose phase centers are situated spaced apart from one another along the first coordinate direction; the particular phase center of at least one of the transmitting antennas being spaced apart from the particular phase centers of the remaining transmitting antennas by an offset value along a second coordinate direction, which is perpendicular to the first coordinate direction; the particular phase center of at least one of the receiving antennas being spaced apart from the particular phase centers by the offset value along the second coordinate direction; and an evaluation unit, with the aid of which electromagnetic signals, which are emitted by the transmitting antennas and received by the receiving antennas, may be evaluated for the decoupled determination of the elevation angle and the azimuth angle of the object.

A phase center is to be understood as the electronic reference point of an antenna, i.e., viewed from the receiving location, the electromagnetic antenna radiation of the corresponding antenna appears to originate from this reference point.

Furthermore, the present invention provides a method for operating a MIMO radar device according to the present invention including the following steps: emitting electromagnetic signals with the aid of the transmitting antennas; receiving electromagnetic signals reflected on the object with the aid of the receiving antennas; detecting virtual phase centers of the received reflected electromagnetic signals; evaluating the received reflected electromagnetic signals to determine the azimuth angle of the object based at least on electromagnetic phase offsets between a first selection from the detected virtual phase centers; and evaluating the received reflected electromagnetic signals to determine the elevation angle of the object based at least on electromagnetic phase offsets between a second selection from the detected virtual phase centers.

By way of a skillfully selected arrangement of the transmitting and receiving antennas of the antenna array in a MIMO radar device, an improved evaluation of the received electromagnetic signals is possible with a consistent number of antennas.

The present invention takes this into consideration and provides a corresponding antenna arrangement having antennas situated spaced apart in two coordinate directions and a method for operating this antenna arrangement.

According to the present invention, an azimuth angle estimation with improved accuracy and an elevation angle estimation with a quality value may be carried out. Because at least one of the transmitting antennas and at least one of the receiving antennas is spaced apart in relation to the other transmitting and receiving antennas along the second coordinate direction by the same offset value, multiple in parallel lines of virtual phase centers result in the virtual array. For example, all virtual phase centers within one parallel line may be used for the computation of the azimuth angle, while in each case one or multiple virtual phase center(s) from various parallel lines is/are used for the computation of the elevation angle.

The antenna arrangement according to the present invention may advantageously include precisely three transmitting antennas and precisely four receiving antennas. The antenna arrangement may advantageously be formed in a monolithic microwave integrated circuit. A particularly small overall size may result in this way.

Furthermore, the transmitting antennas may have fields of vision which are different from one another, so that the radar device may be operated both in a far field mode having a narrow aperture angle and in a near field mode having a broad aperture angle.

The offset value, by which the antennas are partially situated offset from one another along the second coordinate direction, is preferably selected based on wavelength $\lambda$ of the electromagnetic signals to be emitted with the aid of the transmitting antennas and received with the aid of the receiving antennas, and on an elevation angle range from $-\beta$ to $+\beta$, within which objects are to be able to be detected. For example, the offset value may be between one-half and three wavelengths $\lambda$, preferably between one and one-half and two wavelengths $\lambda$. The offset value may also be, for example, $0.5/\sin(\beta)\lambda$.

Advantageous specific embodiments and refinements are described herein.

According to one preferred refinement, each of the transmitting antennas is spaced apart from each other one of the transmitting antennas along the second coordinate direction either not at all or by the offset value. According to another preferred refinement, each of the receiving antennas is spaced apart from each other one of the receiving antennas along the second coordinate direction either not at all or by the offset value. In this way, the arrangement of the virtual phase centers in the virtual array is advantageous for the more precise determination of the elevation angle and the azimuth angle.

According to another preferred refinement, the phase center of a second transmitting antenna, which is situated between a first and a third transmitting antenna, is spaced apart by the offset value from the phase centers of the first and the third transmitting antennas along the second coordinate direction. According to another preferred refinement, the phase center of a second receiving antenna, which is arranged along the first coordinate direction between a first and a fourth receiving antenna, is spaced apart by the offset value from the phase centers of the first and the fourth receiving antennas along the second coordinate direction. According to another preferred refinement, the phase center of a third receiving antenna, which is situated between the second and fourth receiving antennas along the first coordinate direction, is spaced apart by the offset value from the phase centers of the first and the fourth transmitting antennas along the second coordinate direction. The arrangement of the virtual phase centers in the virtual array is advantageous for the more precise determination of the elevation angle and the azimuth angle due to these refinements.

According to another preferred refinement, the transmitting antennas and/or the receiving antennas are designed as patch antennas having columns of patch elements situated in a matrix, the columns being aligned along the second coordinate direction and each having more patch elements than the corresponding patch antenna has columns.

According to one preferred refinement, the method according to the present invention includes the following steps: calculating a first deterministic maximum likelihood function (DML function) for a first subset of the first selection from the detected virtual phase centers; calculating at least one second DML function for a second subset of the first selection from the detected virtual phase centers; and calculating a DML sum function by advantageously weighted summation of the first DML function and the second DML function; the evaluation of the received reflected electromagnetic signals to determine the azimuth angle taking place based on the DML sum function.

A DML function represents an angle-dependent correlation between the electromagnetic signals received at a virtual MIMO array and antenna diagrams, which are predetermined and stored for each angle for the particular virtual array. The function value of the DML function for each angle is between 0 (no correlation) and 1 (total correlation); the function values may be higher for the DML sum function.

BRIEF DESCRIPTION OF THE DRAWINGS

The present invention is explained in greater detail below on the basis of the exemplary embodiments shown in the figures.

In all figures, identical or functionally-identical elements and devices—if not otherwise indicated—are provided with the same reference numerals.

DETAILED DESCRIPTION OF EXAMPLE EMBODIMENTS

Figure 1:
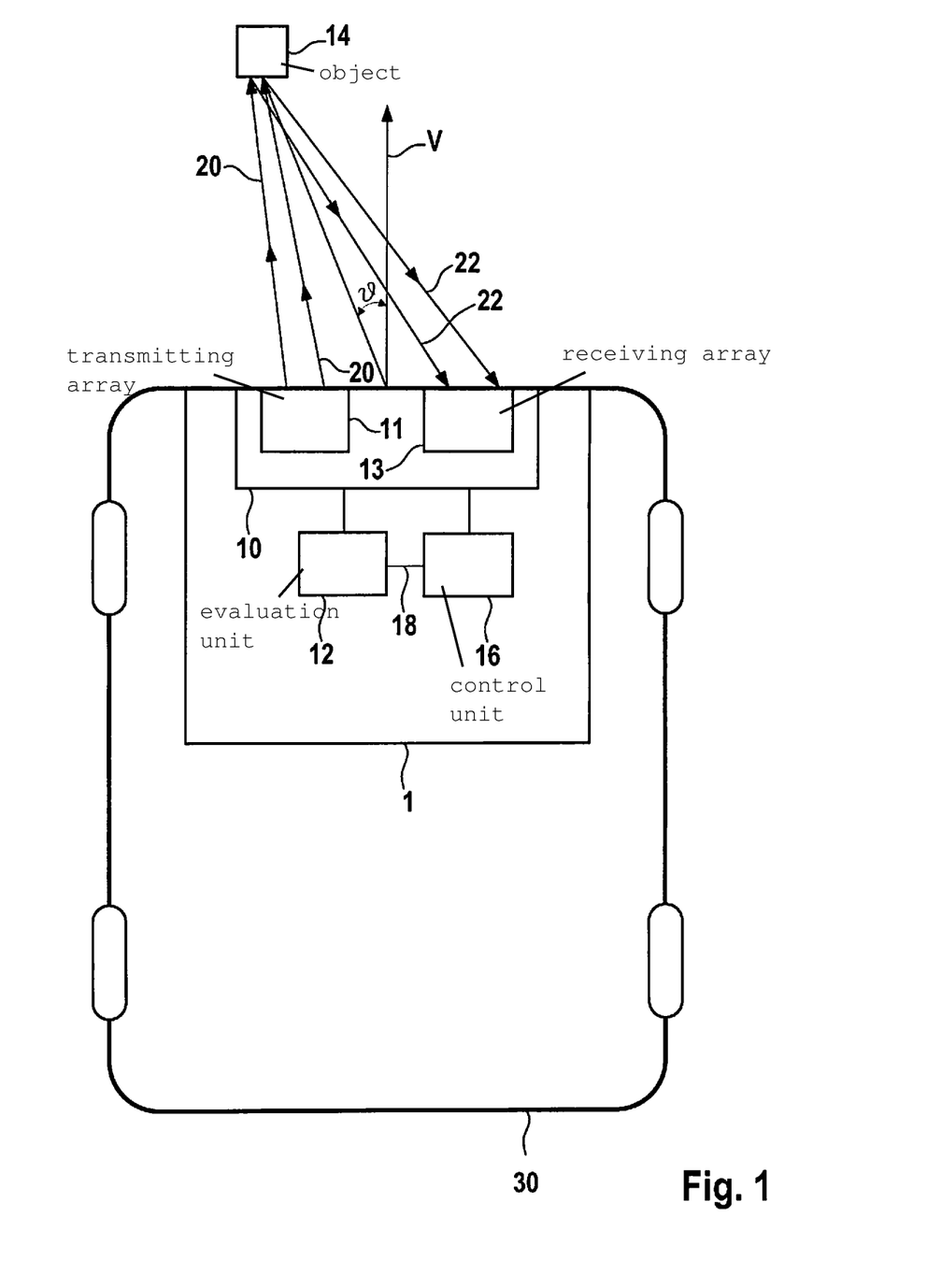
FIG. 1 shows a schematic block diagram of a MIMO radar device for the decoupled determination of an elevation angle and an azimuth angle of an object according to a first specific embodiment of the present invention.

FIG. 1 shows a schematic block diagram of a MIMO radar device 1 for the decoupled determination of an elevation angle and an azimuth angle $\theta$ of an object 14 according to a first specific embodiment of the present invention.

According to FIG. 1, MIMO radar device 1 is situated in a vehicle 30. Radar device 1 includes a planar antenna array 10, an evaluation unit 12, and a control unit 16. The planar antenna array includes a receiving array 13 made up of multiple receiving antennas and a transmitting array 11 made up of multiple transmitting antennas. Electromagnetic signals 20 are emittable from radar device 1 with the aid of the transmitting antennas. Emitted electromagnetic signals 20 may be reflected on an external object 14, for example, whereby reflected electromagnetic signals 22 result. Reflected electromagnetic signals 22 are receivable with the aid of the receiving antennas of receiving array 13 and may be evaluated with the aid of evaluation unit 12 for the decoupled determination of the elevation angle and azimuth angle $\theta$ of object 14. Azimuth angle $\theta$ and the elevation angle are defined in relation to radar device 1. Advantageously, if radar device 1 is situated in a vehicle 30, azimuth angle $\theta$ is measured in relation to forward travel direction V of vehicle 30 with the base point of forward travel direction V on vehicle 30 as the vertex and with a scanned angle sector in parallel to a travel plane of vehicle 30.

The emission of electromagnetic signals 20 is controlled with the aid of control unit 16, which may be connected via data lines 18 to evaluation unit 12, so that parameters provided by control unit 16 regarding phase intervals, transmission times, signal ramps, etc. of emitted electromagnetic signals 20 may be taken into consideration by evaluation unit 12.

Antenna array 10 according to the first specific embodiment of the present invention and an antenna array 10' according to a second specific embodiment of the present invention and an antenna array 10" according to a third specific embodiment of the present invention will be described in greater detail hereafter on the basis of FIGS. 2A through 3B.

Figure 2A:
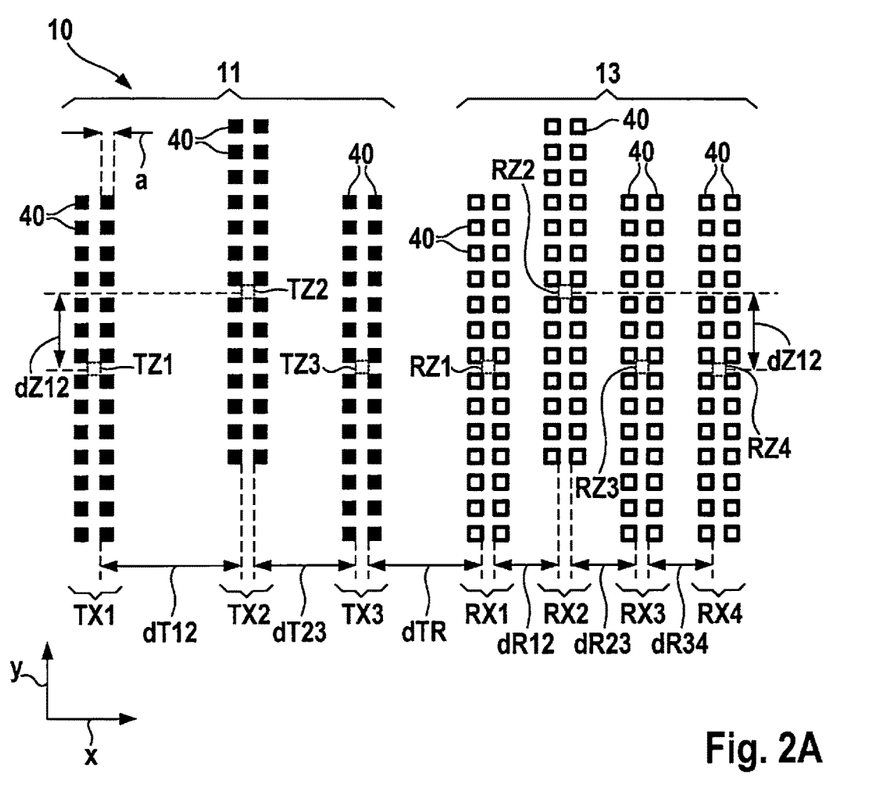
FIG. 2A shows a schematic depiction in a top view of an antenna array of a MIMO radar device according to a first specific embodiment of the present invention.

FIG. 2A shows a schematic depiction in a top view of an antenna array 10 of a MIMO radar device according to the first specific embodiment of the present invention.

A transmitting array 11 of antenna array 10 includes a first transmitting antenna TX1 having a phase center TZ1, a second transmitting antenna TX2 having a phase center TZ2, and a third transmitting antenna TZ3 having a third phase center TZ3. All transmitting antennas TXi, "i" standing as a placeholder for the numbers from 1 through 3, are designed as identically shaped patch antennas, which each have two columns, each in turn having fourteen square patch elements 40. The individual patch elements may be designed, for example, as copper surfaces on a circuit board or as rod-shaped or the like. Patch elements 40 may each be spaced apart from adjacent patch elements 40 by an edge length a of a patch element.

Transmitting antennas TXi are spaced apart from one another along a first coordinate direction x. For example, if antenna array 10 is situated on a front side of a vehicle 30, first direction x is preferably in parallel to the travel plane of vehicle 30 and perpendicular to forward travel direction V of vehicle 30 and may therefore be referred to as "horizontal". The columns of transmitting antennas TXi are aligned along a second coordinate direction y, which is perpendicular to the first coordinate direction. In the example of antenna array 10 situated on the front side of vehicle 30, second coordinate direction y is perpendicular to both the travel plane and forward travel direction V of vehicle 30 and may therefore be referred to as "vertical".

According to the first specific embodiment, second transmitting antenna TX2 is situated along first coordinate direction x between first transmitting antenna TX1 and third transmitting antenna TX3. A first distance dT12 between first and second transmitting antennas TX1, TX2 along first coordinate direction x is greater than a second distance dT23 along first coordinate direction x between second and third transmitting antennas TX2, TX3. Distances between antennas TXi, RXj along first coordinate direction x are always measured here and hereafter between particular phase centers TZi, RZj, "i" and "j" functioning as placeholders as in the case of antennas TXi, TXj.

For example, first distance dT12 is eleven edge lengths of square patch elements 40 and second distance dT23 is eight edge lengths, each of transmitting antennas TXi being three edge lengths a wide along first direction x. Second transmitting antenna TX2 is displaced in comparison to first transmitting antenna TX1 along second coordinate direction y by an offset value dZ12. In other words, phase center TZ2 of second transmitting antenna TX2 is spaced apart from phase center TZ1 of first transmitting antenna TX1 along second coordinate direction y by offset value dZ12, according to FIG. 2A by six edge lengths a. Phase center TZ3 of third transmitting antenna TX3 is not spaced apart along second coordinate direction y from phase center TZ1 of first transmitting antenna TX1. Third transmitting antenna TX3 therefore terminates flush with first transmitting antenna TX1 along second coordinate direction y.

Receiving array 13 of antenna array 10 includes a first, second, third, and fourth receiving antenna RX1, RX2, RX3, RX4 each having corresponding phase centers RZ1, RZ2, RZ3, RZ4. All transmitting antennas RXj, "j" standing as a placeholder for the numbers 1 through 4, are designed as identically shaped patch antennas, which each have two columns, each in turn having fourteen of square patch elements 40. First receiving antenna RX1, which is located closest to third transmitting antenna TX3 along first coordinate direction x, is spaced apart therefrom along the first coordinate direction by an array distance value dTR, for example, by nine edge lengths a.

Receiving antennas RXj are spaced apart from one another along first coordinate direction x. The columns of receiving antennas RXj are aligned along second coordinate direction y.

According to the first specific embodiment, second receiving antenna RX2 is situated along first direction x between first receiving antenna RX1 and third transmitting antenna RX3. Third receiving antenna RX3 is situated along first direction x between second receiving antenna RX2 and fourth transmitting antenna RX4. A fourth distance dR12 between first and second receiving antennas RX1, RX2, a fifth distance dR23 between second and third receiving antennas RX2, RX3, and a sixth distance dR34 between third and fourth receiving antennas RX3, RX3, each along first coordinate direction x, are equal in size and are of five edge lengths a, for example.

Second receiving antenna RX2 is displaced in comparison to first receiving antenna RX1 and third and fourth receiving antennas RX3, RX4 along second coordinate direction y by a seventh distance dRZ12. In other words, phase center RZ2 of second transmitting antenna RX2 is spaced apart from phase centers RZ1, RZ3, RZ4 of first, third, and fourth receiving antennas RX1, RX3, RX4 and also from phase centers TZ1, TZ3 of first and third transmitting antennas TX1, TX2 by offset value dZ12, according to FIG. 2 by six edge lengths a. Phase centers RZ3, RZ4 of third and fourth receiving antennas RX3, RX4 and phase center TZ2 of second transmitting antenna TX2 are not spaced apart along second coordinate direction y from phase center RZ1 of first transmitting antenna TX1, i.e., they are located on a line in parallel to first coordinate direction x. Third and fourth transmitting antennas TX3, TX4 therefore terminate flush along second coordinate direction y with first transmitting antenna TX1y.

Figure 2B:
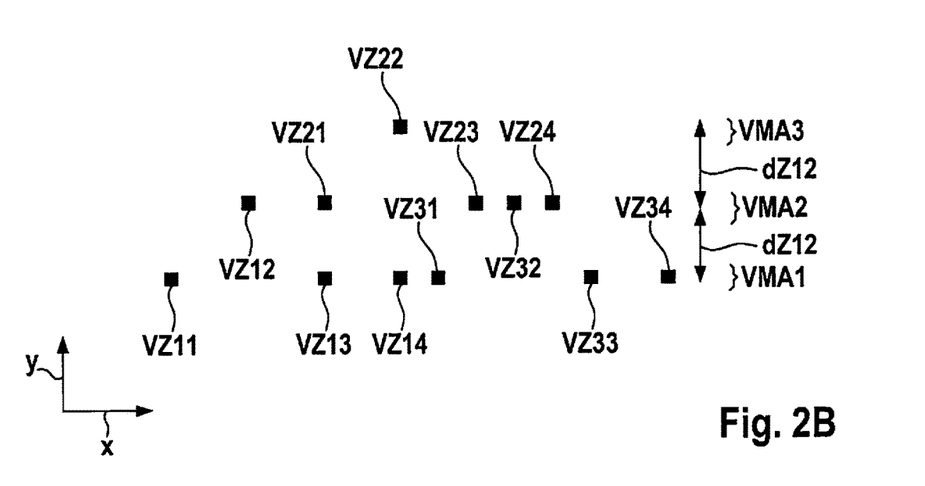
FIG. 2B shows a schematic depiction of virtual phase centers, which result upon use of the antenna array of the MIMO radar device according to the first specific embodiment of the present invention.

FIG. 2B shows a schematic depiction of virtual phase centers VZij, which result upon use of antenna array 10 of the MIMO radar device according to the first specific embodiment of the present invention.

Virtual phase centers VZij, "i" and "j" being placeholders for numbers, arise, as described above, by convolution of actual phase centers TZi of transmitting antennas TXi with actual phase centers RZj of receiving antennas RXj. Virtual phase centers VZij are classifiable according to their location with respect to second coordinate direction y into three virtual MIMO arrays VMA1, VMA2, VMA3. For example, a first virtual MIMO array VMA1 includes virtual phase centers VZ11, VZ13, VZ14, VZ31, VZ33, and VZ34, which arise by way of combination of actual phase centers TZ1 and TZ3 of first and second transmitting antennas TX1, TX3 with actual phase centers RZ1, RZ3, RZ4 of receiving antennas RX1, RX3, and RX4. A second virtual MIMO array VMA2 includes virtual phase centers VZ12, VZ21, VZ23, VZ32, and VZ24. A third virtual MIMO array VMA3 includes only virtual phase center VZ22. First and second virtual MIMO arrays VMA1, VMA2 are spaced apart from one another along second coordinate direction y by the offset value, as are second and third virtual MIMO arrays VMA2, VMA3. Each virtual MIMO array VMA1, VMA2, VMA3 is located on a line which is in parallel to particular other virtual MIMO arrays VMA1, VMA2, VMA3.

To determine the azimuth angle, a first deterministic maximum likelihood function (DML) is prepared as a function of the azimuth angle for first virtual MIMO array VMA1. A DML function represents an angle-dependent correlation between electromagnetic signals 22 received at a virtual MIMO array and predetermined and stored antenna diagrams for the particular virtual array for each angle. Furthermore, a second DML function is prepared as a function of the azimuth angle for second virtual MIMO array VMA2. The first and the second DML functions are added in weighted form to form a DML sum function. The value for which the DML sum function has the greatest correlation is determined as the azimuth angle.

To determine the elevation angle, a third DML function is determined as a function of the elevation angle for virtual phase centers VZ21, VZ22, VZ31, and VZ23 and the value for which the third DML function has the greatest correlation is determined as the elevation angle. The previously computed azimuth angle may be incorporated into this determination, to compensate for the particular azimuth angle dependency of virtual phase centers VZ21, VZ22, VZ31, and VZ23.

The offset of the antennas along first coordinate direction x has the advantage that a higher antenna gain may be achieved in the elevation direction without restricting the distance of antennas along second coordinate direction y and therefore the maximum uniqueness range of the elevation angle estimation. Furthermore, the offset of the antennas along first coordinate direction x enables, in the case of two objects to be detected each having elevation and azimuth angles to be determined, an automatic association between azimuth and elevation angles of each object.

Figure 3A:
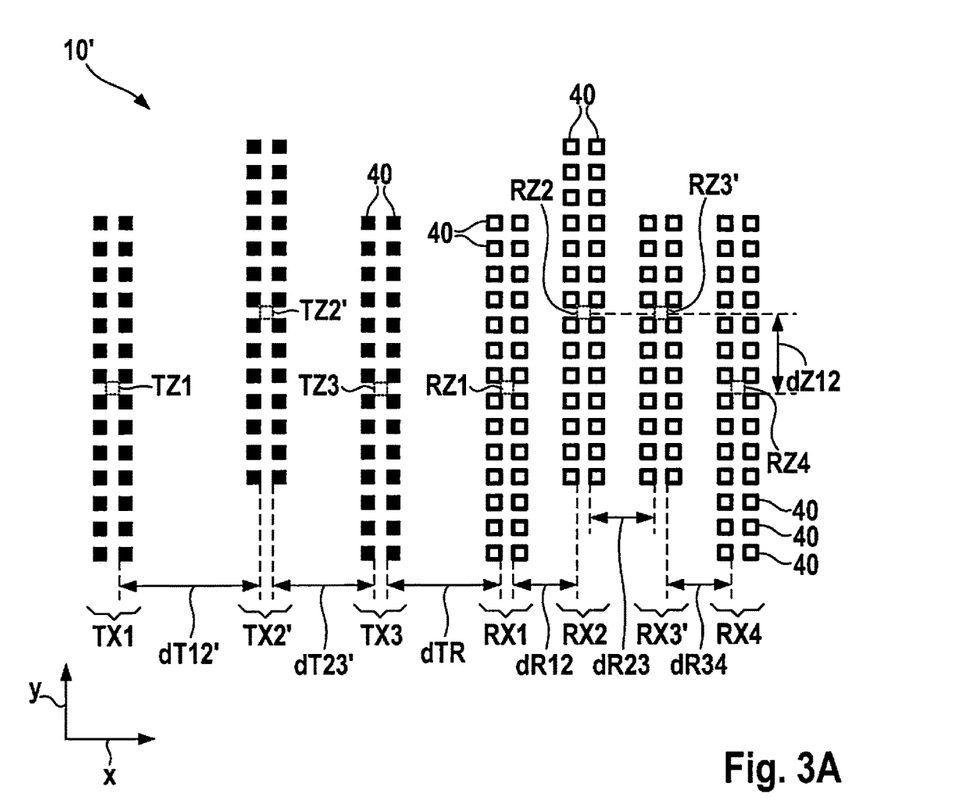
FIG. 3A shows a schematic depiction in a top view of an antenna array of a MIMO radar device according to a second specific embodiment of the present invention.

FIG. 3A shows a schematic depiction in a top view of an antenna array 10' of a MIMO radar device according to a second specific embodiment of the present invention.

Antenna array 10' of the MIMO radar device according to the second specific embodiment is a variant of antenna array 10 of the MIMO radar device according to the first specific embodiment and differs therefrom in the arrangement of second transmitting antenna TX2' and third receiving antenna RX3': first distance dT12' between first and second transmitting antennas TX1, TX2' along first coordinate direction x is equal to second distance dT23' along first coordinate direction x between second and third transmitting antennas TX2', TX3, namely eight edge lengths a.

Third receiving antenna RX3' is displaced in comparison to first receiving antenna RX1 and fourth receiving antenna RX3, RX4 along second coordinate direction y by offset value dZ12. Phase centers RZ2, RZ3' of second and third receiving antennas RX2, RX3' are not spaced apart from phase centers TZ2' of second transmitting antenna TX2' along second coordinate direction y.

Phase centers RZ1, RZ4 of first and fourth receiving antennas RX1, RX4 are not spaced apart from phase centers TZ1', TZ3' of first and third transmitting antennas TX1, TX3 along second coordinate direction y.

Figure 3B:
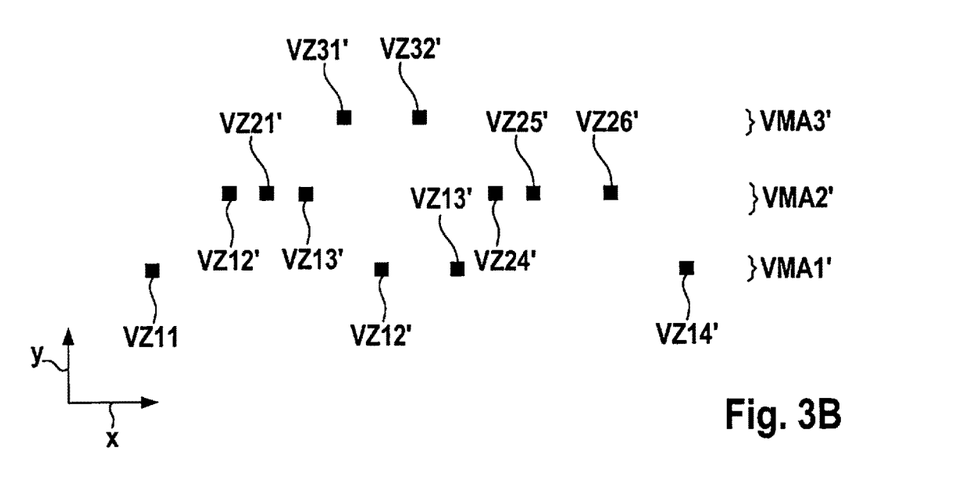
FIG. 3B shows a schematic depiction of virtual phase centers, which result upon use of the antenna array of the MIMO radar device according to the second specific embodiment of the present invention.

FIG. 3B shows a schematic depiction of virtual phase centers VZij', which may result upon use of antenna array 10 of the MIMO radar device according to the first specific embodiment of the present invention. The determination of the elevation and azimuth angles may be carried out similarly as described above with reference to the first specific embodiment.

Figure 4:
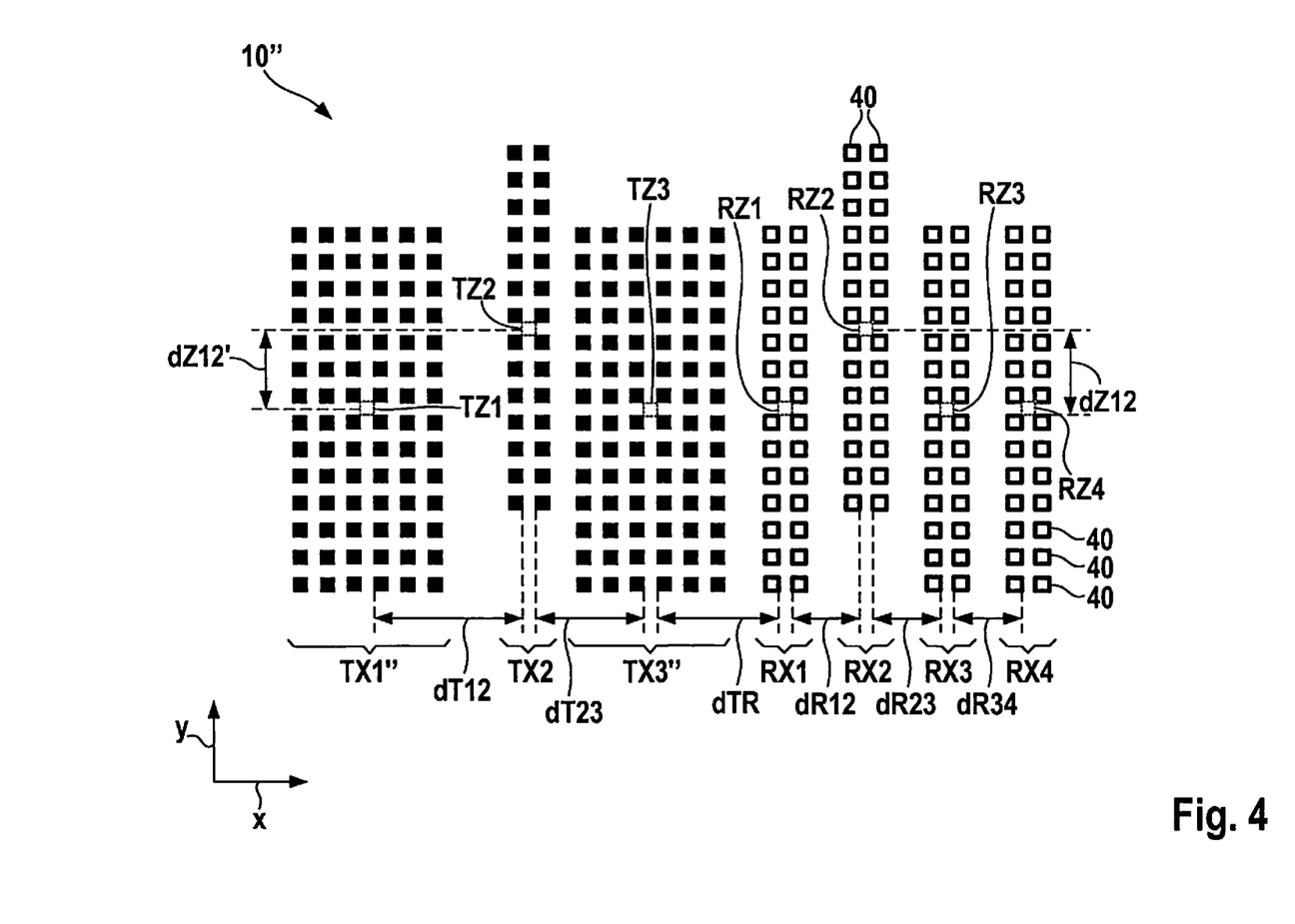
FIG. 4 shows a schematic depiction in a top view of an antenna array of a MIMO radar device according to a third specific embodiment of the present invention.

FIG. 4 shows a schematic depiction in a top view of an antenna array 10" of a MIMO radar device according to a third specific embodiment of the present invention. Antenna array 10" of the MIMO radar device according to the third specific embodiment is a variant of antenna array 10 of the MIMO radar device according to the first specific embodiment and differs therefrom in the shape of first and third transmitting antennas TX1", TX3".

Instead of remaining transmitting and receiving antennas TX2, RXj, first and third transmitting antennas TX1", TX3" are designed as patch antennas each having six columns of fourteen patch elements 40 each. First and third transmitting antennas TX1", TX3" thus have a narrow field of vision, while second transmitting antenna TX2 has a broad field of vision.

Virtual phase centers VZij according to the third specific embodiment correspond to virtual phase centers VZij shown in FIG. 2B. If an object is only detected in the broad field of vision of second transmitting antenna TX2, but not in the narrow field of vision of first or third transmitting antenna TX1", TX3", only virtual phase centers VZ21, VZ22, VZ23, and VZ24 are used to determine the azimuth and elevation angles.

A two-object azimuth angle estimation is furthermore possible in the broad field of vision of second transmitting antenna TX2, however, if at least one of the two objects is located in the narrow field of vision of first or third transmitting antenna TX1", TX3". In contrast, if both objects are located outside the field of vision of first and third transmitting antennas TX1", TX3", i.e., typically in the case of angles having large absolute values, a separation of the targets may be carried out via distance and/or Doppler resolution of the modulation.

Figure 5:
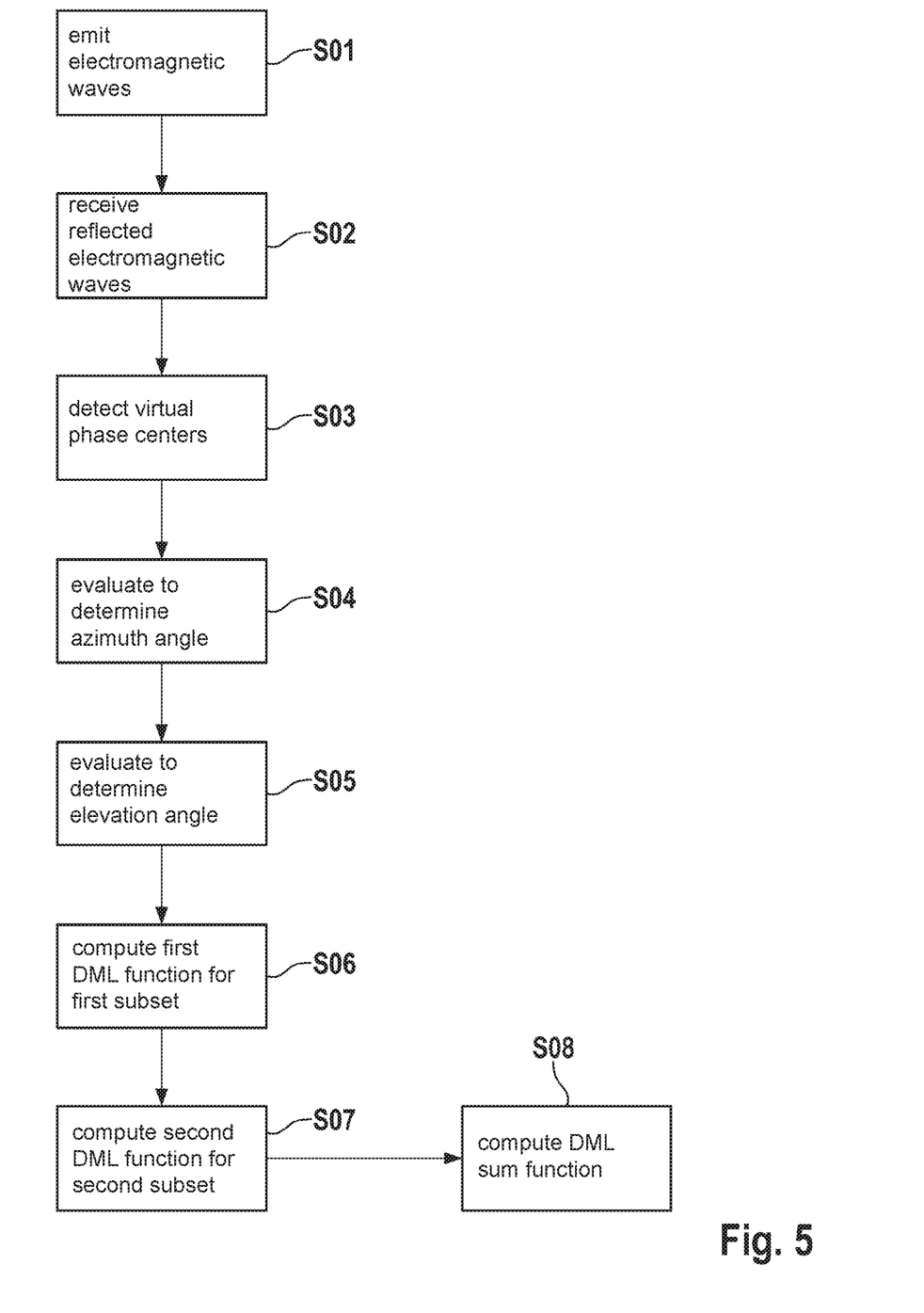
FIG. 5 shows a schematic flow chart to explain a method according to a fourth specific embodiment of the present invention.

FIG. 5 shows a schematic flow chart to explain a method according to a fourth specific embodiment of the present invention. The method according to the fourth specific embodiment and variations thereof are suitable for operating the MIMO radar device according to the present invention and are adaptable according to the refinements and variations of the MIMO radar device. Reference is made to the preceding description, in particular of antenna arrays 10; 10', 10" for details on the steps of the method.

In a step S01, electromagnetic signals 20 are emitted with the aid of transmitting antennas TX1, TX2, TX3; TX1, TX2', TX3; TX1", TX2, TX3". In a step S02, electromagnetic signals 22 reflected on object 14 are received with the aid of receiving antennas RX1, RX2, RX3, RX4; RX1, RX2, RX3', RX4.

In a step S03, virtual phase centers VZ of received reflected electromagnetic signals 22 are detected.

In a step S04, received reflected electromagnetic signals 22 are evaluated to determine the azimuth angle of object 14 based at least on electromagnetic phase offsets between a first selection from detected virtual phase centers VZ. The first selection may be in particular, as described above in the text, those virtual phase centers VZ which are situated in the virtual array along one, in particular multiple virtual straight lines, in particular along a straight line in parallel to first coordinate direction x, preferably in parallel to the travel plane of the vehicle.

In a step S05, received reflected electromagnetic signals 22 are evaluated to determine the elevation angle of object 14 based at least on electromagnetic phase offsets between a second selection from detected virtual phase centers VZ. The second selection may be in particular, as described above in the text, those virtual phase centers VZ which are spaced apart from one another along second coordinate direction y, preferably perpendicularly to the travel plane and the forward travel direction of the vehicle. The second selection is different from the first selection, an incomplete overlap being possible.

In a step S06, a first deterministic maximum likelihood function (DML function) is computed for a first subset of the first selection from detected virtual phase centers VZ. The first subset includes virtual phase centers VZ which are situated in the virtual array along a first virtual straight line in parallel to first coordinate direction x.

In a step S07, at least one second DML function is computed for a second subset of the first selection from detected virtual phase centers VZ. In particular, for each further subset of the first selection, whose virtual phase centers VZ are each situated along a further virtual straight line in parallel to first coordinate direction x, a separate DML function is computed in each case.

In a step S08, a DML sum function is computed by weighted summation of the first DML function and the at least one second DML function. Evaluation S04 of received reflected electromagnetic signals 22 for determining the azimuth angle is carried out based on the DML sum function. In particular, the angle to which the DML sum function assigns the highest correlation value is determined as the azimuth angle.

At least one third DML function may also be computed for the second selection of virtual phase centers DZ, upon evaluation S05 of received reflected electromagnetic signals 22 for determining the elevation angle, the angle to which the third DML function, or a further DML sum function from multiple third DML functions, assigns the highest correlation value again being determined as the elevation angle.

Although the present invention was described above on the basis of preferred exemplary embodiments, it is not restricted thereto, but rather is modifiable in a variety of ways. In particular, the present invention may be altered or modified in manifold ways without deviating from the core of the present invention.

For example, a known misalignment angle of antenna array 10; 10', 10" according to the present invention may be taken into consideration to compensate for an elevation angle dependence of received electromagnetic signals 22 of virtual phase centers VZ for very distant objects 14, whereupon a DML function is computed jointly for multiple subsets of the first selection or for all virtual phase centers VZ of the first selection and the angle having the highest correlation with this jointly computed DML function is determined as the azimuth angle.

Furthermore, numbers of receiving antennas and/or transmitting antennas and patch elements other than those shown and also distances between the antennas other than those shown are also possible.

Instead of a vehicle, the MIMO radar device according to the present invention may also be attached in a stationary fashion, for example, to a bridge or a column.

What is claimed is:

1. A MIMO radar device for a decoupled determination of an elevation angle and an azimuth angle of an object, comprising:
   an antenna array including multiple transmitting antennas whose phase centers are situated spaced apart from one another along a first coordinate direction, and multiple receiving antennas whose phase centers are situated spaced apart from one another along the first coordinate direction, the phase center of at least one of the transmitting antennas being spaced apart from the phase centers of the remaining transmitting antennas by an offset value along a second coordinate direction which is perpendicular to the first coordinate direction, the phase center of at least one of the receiving antennas being spaced apart from the phase centers of the remaining receiving antennas by the offset value along the second coordinate direction; and an evaluation unit with the aid of which electromagnetic signals, which are emitted by the transmitting antennas and received by the receiving antennas, are evaluated for the decoupled determination of the elevation angle and the azimuth angle of the object, wherein the evaluation unit detects, based on the electromagnetic signals, a virtual phase center of each of:
i) a first virtual MIMO array formed by a combination of the remaining transmitting antennas and the remaining receiving antenna,
ii) a second virtual MIMO array formed by a combination of the remaining transmitting antennas and the receiving antennas spaced by the offset value and a combination of the transmitting antennas spaced by the offset value and the remaining receiving antennas, and
iii) a third virtual MIMO array formed by a combination of the transmitting antennas spaced by the offset value and the receiving antennas spaced by the offset value.

2. The device as recited in claim 1, wherein each of the transmitting is spaced apart from each other one of the transmitting antennas either not at all or by the offset value along the second coordinate direction.

3. The device as recited in claim 2, wherein each of the receiving antennas is spaced apart from each other one of the receiving antennas either not at all or by the offset value along the second coordinate direction.

4. The device as recited in claim 1, wherein the phase center of a second one of the transmitting antennas, which is situated along the first coordinate direction between a first and a third one of the transmitting antennas, is spaced apart from the phase centers of the first and the third one of the transmitting antennas by the offset value along the second coordinate direction.

5. The device as recited in claim 1, wherein the phase center of a second one of the receiving antennas situated along the first coordinate direction between a first and a fourth one of the receiving antennas is spaced apart from the phase centers of the first and the fourth one of the receiving antennas by the offset value along the second coordinate direction.

6. The device as recited in claim 5, wherein the phase center of a third one of the receiving antennas, which is situated along the first coordinate direction between the first and the fourth one of the receiving antennas, is spaced apart from the phase centers of the first and the fourth one of the transmitting antennas along the second coordinate direction by the offset value.

7. The device as recited in claim 1, wherein at least one of: i) the transmitting antennas, and ii) the receiving antennas, are designed as patch antennas having columns of patch elements situated in a matrix, columns of the matrix being aligned along the second coordinate direction and each having more patch elements than the corresponding patch antenna columns.

8. The device as recited in claim 7, wherein at least one of the transmitting antennas and receiving antennas has a greater number of columns of patch elements than the remaining transmitting antennas and receiving antennas.

9. A method for operating a MIMO radar device, the MIMO radar device including an antenna array including multiple transmitting antennas whose phase centers are situated spaced apart from one another along a first coordinate direction, and multiple receiving antennas whose phase centers are situated spaced apart from one another along the first coordinate direction, the phase center of at least one of the transmitting antennas being spaced apart from the phase centers of the remaining transmitting antennas by an offset value along a second coordinate direction which is perpendicular to the first coordinate direction, the phase center of at least one of the receiving antennas being spaced apart from the particular phase centers of the remaining receiving antennas by an offset value along the second coordinate direction, and an evaluation unit with the aid of which electromagnetic signals, which are emitted by the transmitting antennas and received by the receiving antennas are evaluated for the decoupled determination of the elevation angle and the azimuth angle of the object, the method comprising:
emitting electromagnetic signals with the aid of the transmitting antennas;
receiving electromagnetic signals reflected on the object with the aid of the receiving antennas;
detecting virtual phase centers of the received reflected electromagnetic signals;
evaluating the received reflected electromagnetic signals to determine an azimuth angle of the object based at least on electromagnetic phase offsets between a first selection from the detected virtual phase centers; and
evaluating the received reflected electromagnetic signals to determine the elevation angle of the object based at least on electromagnetic phase offsets between a second selection from the detected virtual phase centers, wherein the evaluation unit detects, based on the electromagnetic signals, a virtual phase center of each of:
i) a first virtual MIMO array formed by a combination of the remaining transmitting antennas and the remaining receiving antenna,
ii) a second virtual MIMO array formed by a combination of the remaining transmitting antennas and the receiving antennas spaced by the offset value and a combination of the transmitting antennas spaced by the offset value and the remaining receiving antennas, and
iii) a third virtual MIMO array formed by a combination of the transmitting antennas spaced by the offset value and the receiving antennas spaced by the offset value.

10. The method as recited in claim 9, wherein the evaluating for determining the azimuth angle includes:
computing the first DML function for a first subset of the first selection from the detected virtual phase centers;
computing the second DML function for a second subset of the first selection from the detected virtual phase centers; and
computing a DML sum function by weighted summation of the first DML function and the second DML function;
wherein the evaluation of the received reflected electromagnetic signals to determine the azimuth angle is carried out based on the DML sum function.

11. A MIMO radar device for a decoupled determination of an elevation angle and an azimuth angle of an object, comprising:
an antenna array including multiple transmitting antennas whose phase centers are situated spaced apart from one another along a first coordinate direction, and multiple receiving antennas whose phase centers are situated spaced apart from one another along the first coordinate direction, the phase center of at least one of the transmitting antennas being spaced apart from the phase centers of the remaining transmitting antennas by an offset value along a second coordinate direction which is perpendicular to the first coordinate direction, the phase center of at least one of the receiving antennas being spaced apart from the phase centers of the remaining receiving antennas by an offset value along the second coordinate direction; and an evaluation unit with the aid of which electromagnetic signals, which are emitted by the transmitting antennas and received by the receiving antennas, are evaluated for the decoupled determination of the elevation angle and the azimuth angle of the object, wherein:

the evaluation unit determines the azimuth angle on the basis of a first deterministic maximum likelihood (DML) function and a second DML function, and the evaluation unit determines the elevation angle on the basis of a third DML function that is different than the first DML function and the second DML function.

12. A method for operating a MIMO radar device, the MIMO radar device including an antenna array including multiple transmitting antennas whose phase centers are situated spaced apart from one another along a first coordinate direction, and multiple receiving antennas whose phase centers are situated spaced apart from one another along the first coordinate direction, the phase center of at least one of the transmitting antennas being spaced apart from the phase centers of the remaining transmitting antennas by an offset value along a second coordinate direction which is perpendicular to the first coordinate direction, the phase center of at least one of the receiving antennas being spaced apart from the particular phase centers of the remaining receiving antennas by an offset value along the second coordinate direction, and an evaluation unit with the aid of which electromagnetic signals, which are emitted by the transmitting antennas and received by the receiving antennas are evaluated for the decoupled determination of the elevation angle and the azimuth angle of the object, the method comprising:

emitting electromagnetic signals with the aid of the transmitting antennas;

receiving electromagnetic signals reflected on the object with the aid of the receiving antennas;

detecting virtual phase centers of the received reflected electromagnetic signals;

evaluating the received reflected electromagnetic signals to determine an azimuth angle of the object based at least on electromagnetic phase offsets between a first selection from the detected virtual phase centers; and evaluating the received reflected electromagnetic signals to determine the elevation angle of the object based at least on electromagnetic phase offsets between a second selection from the detected virtual phase centers, wherein:

the evaluating includes determining the azimuth angle on the basis of a first deterministic maximum likelihood (DML) function and a second DML function, and the evaluating includes determining the elevation angle on the basis of a third DML function that is different than the first DML function and the second DML function.

* * * * *